July 22, 1952

H. L. HANSON 2,604,264

STOKER CONTROL APPARATUS

Filed Feb. 28, 1949

INVENTOR.
HENRY L. HANSON
BY
George H Fisher
ATTORNEY

Patented July 22, 1952

2,604,264

UNITED STATES PATENT OFFICE 2,604,264

STOKER CONTROL APPARATUS

Henry L. Hanson, Minneapolis, Minn., assignor to Minneapolis-Honeywell Regulator Company, Minneapolis, Minn., a corporation of Delaware Application February 28, 1949, Serial No. 78,850

14 Claims. (Cl. 236—9)

1

The present invention is concerned with automatically controlling the operation of the stoker for stoker fired furnace.

More particularly, the present invention is concerned with a control apparatus which will automatically control a stoker associated with a stoker fired furnace to maintain a desired temperature in a space and at the same time insure a combustion maintaining fire in the furnace regardless of the demand for heat in the space where the temperature is being controlled. In devices of the present type it is desired that a holding or maintaining fire always be burning in the furnace so that, upon a subsequent demand for additional heat in the space it is only necessary to add additional fuel and air to the furnace. With such an arrangement it is also desired that the furnace temperature be kept under a predetermined maximum value and, further, that the stoker be rendered inoperative whenever the fire within the furnace is too low to maintain combustion so as to prevent the adding of additional fuel to the furnace when there is insufficient fire to ignite it.

It is therefore an object to provide new and improved control apparatus for maintaining a desired temperature in a space and which will at the same time maintain a desired fire temperature in the furnace.

A further object of the present invention is to provide new and improved control apparatus which will render a stoker inoperative whenever the temperature of the stoker fire exceeds a predetermined high value or is less than a predetermined low value.

Still another object of the present invention is to provide a condition controlling apparatus utilizing an electrical network having condition sensing impedances therein, with one of the impedances being directly exposed to a condition of a condition changing means; another of the impedances being responsive to a different condition representative of a condition of the condition changing means, and relay means controlled by the network to actuate the condition changing means whenever there is a predetermined differential between the impedances of the network.

A still further object of the present invention is to provide a condition control apparatus utilizing an electrical network whose voltage output is indicative of the condition to be controlled and providing therewith sensing means which includes an electrically operated relay and a pair of control devices which are operative to render the relay inoperative whenever the electrical condition of the network exceeds predetermined limits.

Still another object of the present invention is to provide control apparatus including a network circuit, a relay for energizing a condition changing means, and a pair of electronic control devices, one of which is operative when the differential of the values of a pair of impedances of the network circuit is less than a predetermined amount and the other of which is operative when the differential between the impedances is greater than a predetermined amount, either of said electronic control devices, when operating, maintaining the relay means inoperative.

Other objects of the present invention will be apparent upon considering the accompanying specification, claims, and drawings of which:

Figure 1:
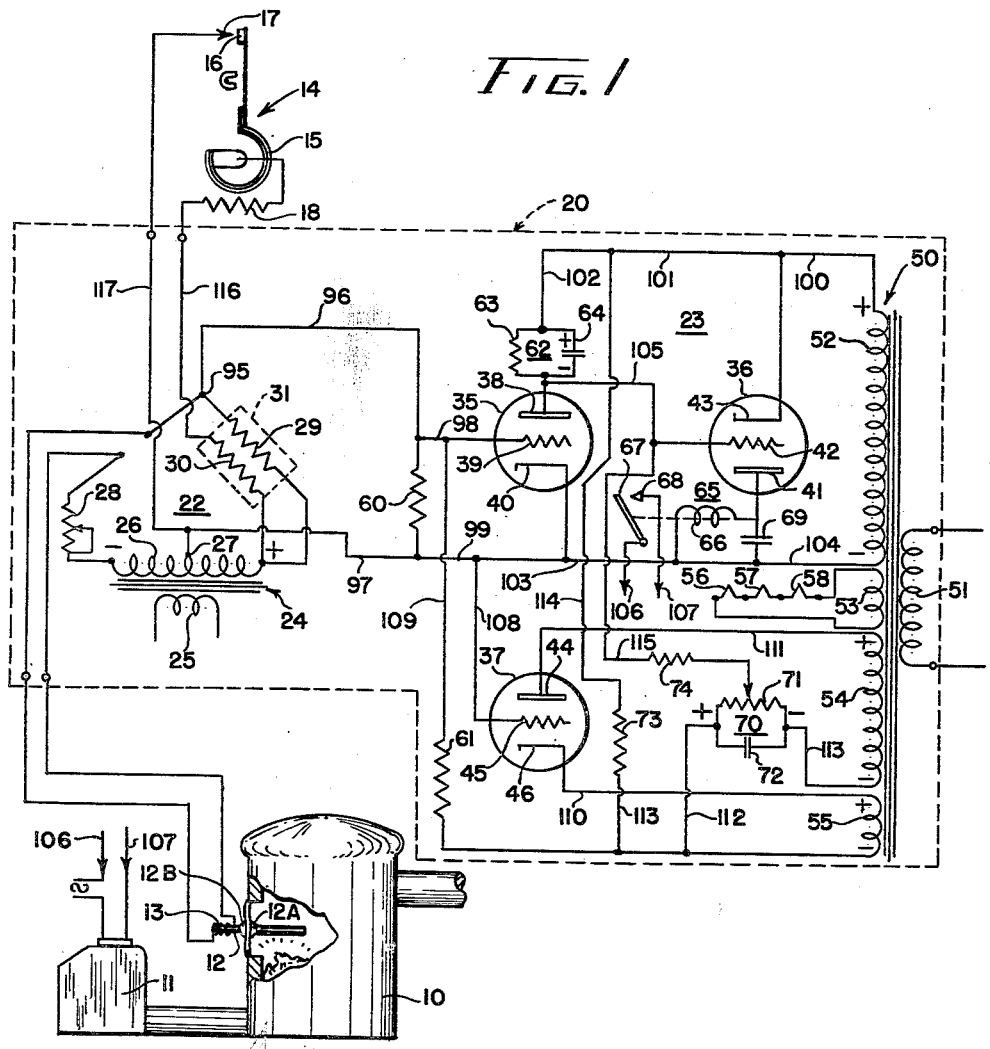
Figure 1 is a schematic view of one form of the present control apparatus.

Referring now to Figure 1, the numeral 10 represents a furnace supplied with coal and air by a stoker 11, or other suitable burner, furnace 10 being used to supply heat to an enclosed space by a distributing system, not shown. The presence and magnitude of combustion within the furnace 10 is determined by a sensing element 12 having an inner portion extending into the combustion chamber of the furnace and having a temperature sensitive resistance wire associated therewith and wound on the portion of the element extending outside of the combustion area, the impedance 13 thus responding to a temperature lower than but proportional to the temperature inside said combustion chamber. The sensing element 12 is supported in the fire door of furnace 10 by a pair of insulating members 12A and 12B. These are so arranged upon the element 12 as to minimize the heat conduction between the furnace door and the element 12. Thus, the temperature sensitive resistor 13 is not exposed to the full direct heat of the fire but is able to respond with reasonable accuracy to the intensity of the fire. For a more complete disclosure of element 12, reference is made to copending application of Joseph Donna, Serial No. 77,474, filed February 21, 1949, now Patent No. 2,583,293. Obviously, element 13 may be directly exposed to the furnace fire or may be otherwise arranged to respond to fire temperature.

The need for heat from furnace 10 is determined by a thermostatic device 14 located in a representative portion of the enclosed space heated by said furnace and wherein it is desired to maintain a constant temperature. This thermostatic device 14 is conventional and comprises a bimetallic member 15 which is operative to move a pair of contacts 16 and 17 into and out of engagement in accordance with the changes in temperature of said space. The bimetal 15 of thermostat 14 is also influenced by a heater 18 arranged to be energized when contacts 16 and 17 are in engagement.

Thermostat 14 controls stoker 11 by influencing the balance conditions of a network circuit 22 which in turn controls electronic apparatus 23. The components of circuit 22, with the exception of resistor 13, and the electronic apparatus 23 are preferably assembled to form a unit 20, conveniently referred to as electronic relay unit or amplifier 20.

When the temperature of the enclosed space decreases, the contacts 16 and 17 will close and will control suitable circuits within a housing 20. The circuits in housing 20 in turn will cause energization of the stoker 11.

The electrical network 22 is energized by a transformer 24 having a primary winding 25 connected to a suitable source of power and a secondary winding 26 tapped at 27, tap 27 constituting an output terminal for network 22 and the two portions of secondary winding 26 constituting elements of the network. The end terminals of the secondary winding 26 are connected to the other elements of the network including a calibration rheostat 28, a pair of terminals connected to the fire temperature sensing impedance 13, and a further temperature sensitive resistor 29. A terminal 95 between resistors 13 and 29 is the other output terminal for the circuit 22. Resistor 29 is arranged in heat exchange relation with a suitable heater 30 adapted to be energized by a portion of the secondary winding 26 through a circuit completed through the thermostat 14. The heater 30 and temperature sensing resistor 29 are positioned in an enclosure 31 and this enclosure may be either insulated or constructed with sufficient mass for storing heat over a period of time.

The output terminals of the network 22 are connected to the electronic apparatus 23, this apparatus including electron discharge devices 35, 36, and 37. The discharge device 35 comprises an anode 38, a control electrode 39 and a cathode 40; device 36 comprises an anode 41, a control electrode 42 and a cathode 43, and the device 37 comprises an anode 44, a control electrode 45 and a cathode 46. Apparatus 23 is energized by a transformer 50 having a primary winding 51 connected to the common source of power and a plurality of secondary windings 52, 53, 54 and 55. Winding 52 supplies the anode voltages for the devices 35 and 36, and winding 53 supplies current to the series connected filament heaters 56, 57 and 58 of devices 35, 36 and 37, respectively. When these heaters are energized, the associated cathodes of their respective discharge devices will become electron emmissive and will pass current in the usual manner. The windings 54 and 55 are used to supply operating voltages for device 37.

Grid 39 and cathode 40 of discharge device 35 are connected together by grid resistor 60 and the input circuit of discharge device 37 includes both resistor 60 and resistor 61. The anode 38 of device 35 is connected to grid 42 of device 36 and is also connected to cathode 43 of device 36 through a network 62 comprising a resistor 63 and a condenser 64 connected in parallel. Anode 41 of device 36 is connected to winding 66 of relay 65, said relay including a switch arm 67 engageable with contact 68 when winding 66 is energized. A by-pass condenser 69 is connected across relay winding 66.

Anode 44 of discharge device 37 is connected through winding 54 of transformer 50, a network 70 and isolating resistor 74 to the grid 42 of discharge device 36, said network 70 including potentiometer 71 and condenser 72. Also, an isolating resistor 73 is connected between the input circuit of device 37 and cathode 43 of device 36.

*Operation*

In considering the operation of the subject apparatus, consider first the operation when thermostat 14 responds to a temperature at or above its set point and contacts 16 and 17 are open. Under these conditions, it is desired that only a maintaining or holding fire be kept burning within the furnace 10. If the thermostat contacts have been open for a considerable time, the heater 30 will be at ambient temperature, therefore the resistor 29 will be at the ambient temperature of unit 20. The resistance of the resistor 29 at ambient temperature is graphically shown by point 80 on the temperature-resistance curves shown in Figure 2. The solid line 81 shows the relation of temperature and resistance of the resistor 29 as it is heated by heater 30. Lines 82, 83 and 84 represent the critical resistance values of the resistor 13 at which it effects operation of the control apparatus.

Figure 2:
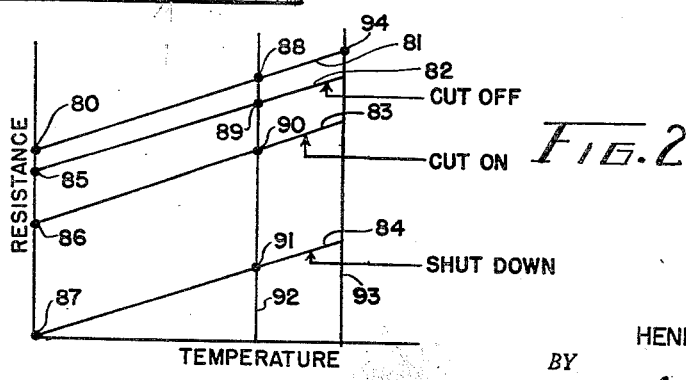
Figure 2 shows graphically the operating relation between the control impedances of the apparatus shown in Figure 1.

Assuming that the resistance of resistor 13 is that shown at point 85 upon the "cut off" line 82, network 22 will be unbalanced sufficiently to cause the discharge device 35 to be conducting. Assuming a phasing of the secondary winding for particular half cycles with the left hand end being negative and the right hand end being positive, the balance of the network 22, with the resistances as shown in Figure 2, will be such that the upper network terminal 95 will be only slightly negative with respect to the tap 27 on secondary 26. This voltage is exerted across resistor 60 by a circuit traced from the terminal 95 through conductor 96, resistor 60, and conductor 97 back to the tap 27 and is applied to the input of device 35 because the upper terminal of resistor 60 is connected to the control electrode 39 by a conductor 98, the lower end of the resistor 60 being connected to the cathode 40 by a conductor 99. With the secondary 26 phased as shown, and assuming an alternating current phasing of secondary 52 such that its upper terminal is positive with respect to the lower terminal, the discharge device 35 will be passing a small amount of current depending upon the magnitude of the slightly negative voltage applied to the control electrode 39. When there is a current flowing through the discharge device 35 there will be an output voltage in the output network 62.

With the discharge device 35 conducting, a current flow circuit may be traced from the upper terminal of secondary 52 through conductors 100, 101, and 102, network 62, anode 38, cathode 40, and conductors 103 and 104 to the lower terminal of secondary 52. With the current following the circuit traced, there will be a voltage drop across the network 62 such that its upper terminal will be positive and its lower terminal will be negative. The upper terminal of network 62 is connected to the cathode 43 of discharge device 36 by conductors 102 and 101, while the lower terminal of network 62 is connected to the control electrode 42 by conductor 105. This will cause the control electrode 42 of discharge device 36 to be effectively negative with respect to its cathode 43, and this negative voltage will be sufficient to maintain the device 36 nonconducting so that there will be no current flowing through relay winding 66 in the output circuit of this discharge device. With relay 65 deenergized there is no effective energizing circuit for stoker 11, and the apparatus will be in the deenergized condition shown in the drawing.

As the fuel in the furnace is gradually consumed, the temperature of the fire will decrease and, likewise, the temperature and resistance of resistor 13 will also decrease by a corresponding amount. This decrease in resistance results in network 22 becoming further unbalanced, with terminal 95 becoming more negative with respect to terminal 27, when the secondary is phased as shown. With this more negative voltage on terminal 95, the more negative voltage applied to the input of discharge device 35 will cause said device to stop conducting. At the point when discharge device 35 is no longer conducting, the resistance of the resistor 13 will be that shown at 86 on the "cut on" line 83. Since the discharge device 35 is no longer conductive, there will no longer be a voltage built up across the network 62 and therefor no biasing voltage on the input of discharge device 36, so this device will now start conducting. The conducting circuit may be traced from the lower terminal of secondary 52 through conductor 104, relay winding 66, anode 41, cathode 43, and conductor 100 back to the upper terminal of secondary 52.

With sufficient current flowing through the relay winding 66, switch blade 67 is pulled into engagement with contact 68 to complete an electrical circuit, shown by the arrows 106 and 107, to the stoker 11. With the stoker 11 energized, fuel and air will be fed into the furnace 10 and, if the operation is normal, the fire in the furnace will increase in temperature, followed by an increase in temperature and resistance of element 13. After a period of operation of the stoker, the resistance of the resistor 13 will increase to a value represented by the point 85 on the "cut off" line 82. As mentioned above, as soon as the resistance of element 13 reaches the value represented by point 85 in Fig. 2, the balance of the electrical network 22 will be such that the discharge device 35 will be conductive and will bias the discharge device 36 sufficiently to make it nonconducting. When the device 36 is no longer conducting, the relay 66 is deenergized and the switch blade 67 drops out of engagement with contact 68 and opens the energizing circuit to the stoker 11.

The above discussed operation will continue as long as the stoker fire is operating normally and there is no demand for stoker operation by the thermostat 14. Thus, as discussed above, the control apparatus is maintaining a sufficient level of combustion or temperature within the furnace to insure that a maintaining or holding fire is always present.

Assume now that operation of the furnace becomes abnormal due, for example, to exhaustion of the coal supply. With the fire dying out, the temperature within the furnace will decrease as will the temperature and resistance of the resistor 13. As soon as the resistance of resistor 13 has decreased to a point represented by point 86 on the "cut on" line 83 in Figure 2, the network 22 will be unbalanced sufficiently to make the discharge device 35 nonconducting so that the device 36 will become conductive and energize the stoker control relay 65, as previously described. However, if the fuel supply for the stoker has been exhausted, or if the fuel being supplied is not capable of being burned, the temperature within the furnace 10 will continue to decrease and at a somewhat accelerated rate because of the fact that cold air and possibly cold fuel is being supplied to the furnace. After a time, the temperature will have dropped to such a value that the resistance of resistor 13 will be represented by point 87 upon the "shutdown" curve 84. When the resistance of element 13 has reached this particular value, it is desired that the entire apparatus be shut down to prevent the further operation of the stoker. The continued decrease in temperature of the resistor 13 results in the balance of the network 22 becoming more negative than described above.

As yet, no consideration has been given to the operation of discharge device 37 and its connecting circuits. Neglecting for the moment the output from network 22, it will be seen that normally the discharge device 37 is inoperative because its cathode 46 is biased to be slightly positive with respect to its control electrode 45 by secondary winding 55. The phasing of winding 55 is the same as that of the winding 54, the latter of which is connected to anode 44 of device 37. As thus arranged, device 37 will be nonconducting and there will be no output current flowing through the network 70.

Considering now that network terminal 95 is highly negative with respect to tap 27, it will be noted that the control electrode 45 of device 37 is connected to the tap 27 of network 22 through conductors 97, 99 and 108. The cathode 46 is connected to the output terminal 95 through conductors 96, 98 and 109, resistor 61, winding 55, and conductor 110. Thus, the output voltage of the network 22 is applied to the discharge device 37 in such a manner that the control electrode 45 is connected to the positive terminal of the network while the cathode 46 is connected to the negative terminal of the network assuming the phasing shown upon the drawing.

With a large enough positive voltage applied to the control electrode 45, this voltage will overcome the fixed alternating current bias from the secondary winding 55 and the discharge device 37 will become conductive. The conductive circuit for this discharge device may be traced from the upper terminal of secondary winding 54 through conductor 111, anode 44, cathode 46, conductor 110, winding 55, conductor 112, network 70, and conductor 113 to the lower terminal of secondary winding 54. With current flowing in this circuit, there will be a voltage drop across the network 70 such that its right hand terminal will be negative and its left hand terminal will be positive. At least a portion of the voltage drop across the network 70 is applied to the input of discharge device 36 by the following circuits. The left hand terminal of the network 70 is connected to the cathode 43 of discharge device 36 by a circuit traced from said left hand terminal through conductor 112, conductor 113, resistor 73, conductor 114 and conductor 101 to cathode 43. The control electrode 42 is connected to a negative portion of the network 70 by a circuit traced from the slider of the potentiometer 71 through resistor 74 and conductor 115 to the control electrode 42. With a negative voltage thus applied to the control electrode 42, the device 36 will no longer be conducting and cannot energize the stoker control relay 65. Thus, the stoker 11 will become stopped and will remain inactive until such time as the fire in the furnace 10 is rekindled. Obviously, this arrangement for shutting down the stoker keeps the furnace from filling up with unburned fuel.

Assume now that the thermostat 14 cools and bimetal 15 moves contact 16 into engagement with contact 17. This completes an electrical circuit from the right hand terminal of secondary 26 through heater 30, conductor 116, heater 18, bimetal 15, switch contact 16, switch contact 17 and conductor 117 back to tap 27 on secondary 26. With this circuit completed, heater 30 begins to rise in temperature, and the increase in temperature will be applied to resistor 29. As the temperature of resistor 29 increases, its resistance also increases, and this will unbalance the network 22 in the same direction as will the cooling of resistor 13 due to less fire in furnace 10. With an increase in resistance of resistor 29, the network 22 will become unbalanced in a direction to cause the discharge device 35 to become nonconducting so that the output of this device will be ineffective to bias the device 36 to be nonconducting. Then, with discharge device 36 conducting, the resulting current flow energizes relay 65 and causes operation of stoker 11 by circuits previously traced.

The operation of stoker 11 causes an increase in temperature in the furnace 10 due to the additional fuel and air being supplied thereto. With the temperature of the fire in the furnace increasing, and with resistor 29 now at a higher temperature, it will be seen that the stoker will operate until the resistance differential between resistors 13 and 29 becomes less than a predetermined amount. Thus, for example, if the temperature of the element 29 has reached a point on the temperature line 92, in Figure 2, the resistance of element 29 will be represented by the point 88 on the line 81. Then, to stop stoker 11, it is necessary that the resistance of element 13 be at or above the value represented by point 89 on the "cut off" curve or line 82. This "cut off" point is at a temperature considerably higher than the "cut off" point represented by point 85, which was effective when the resistor 29 was at ambient temperature.

If the need for temperature change is relatively light, the thermostat 14 will keep its contacts closed for a relatively short time due to anticipating heater 18 which heats bimetal 15 and tends to cause periodic operation of the thermostat contacts 16 and 17. This results in a cycling energization of the heater 30.

If the heater 30 and the resistance element 29 are adequately lagged by heat insulation or by heat storing material, it is possible to maintain the resistor 29 at a temperature which varies fairly uniformly and this temperature, determined by the percentages of on and off time of heater 30 and shown by line 81 in Figure 2, is representative of the load demand on the system. Thus, the effect of an increased load on the system is an increase in the control point of the network, thereby requiring higher "cut off" and "cut on" temperatures for element 13 than was the case when resistor 29 was at ambient temperature.

Assuming a particular average temperature condition and resistance of resistor 29, represented by point 88 on line 81 in Figure 2, the critical control points of the network are those shown by the intersection of line 92 with the "cut off" line 82, the "cut on" line 83 and the "shut down" line 84. From this, it is seen that when the resistance of element 13 is represented by point 89, the control network 22 will have an electrical balance such that the discharge device 35 will be conducting and the device 36 will be nonconducting. Under these conditions, relay 65 cannot energize stoker 11. When the temperature in furnace 10 has decreased so that the resistance of element 13 is now represented by the point 90 on the "cut on" line 83, the balance of the electrical network 22 will be such as to make the discharge device 35 nonconducting, hence device 36 will conduct and energize relay 65, and thereby energize stoker 11. With stoker 11 operating, the temperature in the furnace 10 will increase until such time as the resistance of resistor 13 has again changed to the point 89 upon the "cut off" line 82, whereupon relay 65 will again be deenergized.

In the event that the fire should become extinguished for any reason, even though thermostat 14 is demanding heat, the temperature of the furnace will decrease and, after a time, the resistance of resistor 13 will cool to the point where its resistance will be as shown by point 91 on the "shut down" line 84. When this occurs, the discharge device 37 will become operative and will apply a negative voltage to the control electrode 42 of discharge device 36 so that the discharge device 36 will no longer energize the control relay 65 and thus stop the stoker.

Obviously, for different load demand conditions, the temperature of the resistance element 29 will change in accordance with the amount of heat applied thereto by the heater 30 as it is energized by the cyclically operating thermostatic device 14.

Should contacts 16 and 17 of thermostat 14 remain continuously closed, due to a heavy heating load or the like, the circuit to the heater 30 will be continuously energized. However, the temperature of heater 30 cannot go above a predetermined value determined by the characteristics of the heater and its energizing circuit. Thus, with heater 30 continuously energized, the resistor 29 will tend to reach a fixed maximum temperature, represented by the line 93 in Figure 2. With this maximum temperature, the resistance of the element 29 will be, for example, represented by the point 94 on the curve 81. The critical resistances for element 13 will then be determined by intersection of line 93 with the "cut off" line 82, the "cut on" line 83 and the "shut down" line 84. When the resistor 29 is at its maximum temperature the present apparatus will tend to maintain the stoker fire at a relatively high temperature such that the temperature of element 13 will vary along line 93 and the resistance of the element 13 will vary between the intersection of line 93 and the "cut off" line 82 and the "cut on" line 83. Any tendency for the furnace fire to go above a temperature sufficient to raise the temperature and resistance of element 13 above its maximum "cut off" value will cause the system to deenergize the control relay 65 and stop the stoker 11.

From the foregoing it will be seen that there has been provided a control apparatus for a stoker fired furnace which utilizes an impedance network for controlling the energization of a control relay and which apparatus provides for maintaining a desired stoker fire temperature as well as space temperature by utilizing a single control relay. The apparatus further provides for shutting down the stoker whenever the fire in the furnace is not capable of maintaining combustion or shutting down the stoker whenever the furnace temperature has reached a predetermined safe maximum. While a specific embodiment of the invention is shown, it will be obvious to those skilled in the art that many modifications can be made within the scope of the invention and therefore the invention is to be limited only by the scope of the appended claims.

I claim as my invention:

1. Control apparatus for a burner for a furnace, comprising in combination, electrical impedance means for sensing the temperature within the furnace, a relay adapted to control energization of the burner, electronic amplifying means interconnecting said impedance means and said relay to effect energization of said relay in accordance with the temperature of said impedance, and electrical circuit means directly interconnected between said impedance means and said amplifier means for rendering said amplifying means ineffective to energize said relay when the temperature within said furnace drops below a predetermined value.

2. Control apparatus for a stoker fired furnace, comprising in combination, electrical impedance means for sensing the temperature conditions of the stoker fire, a relay adapted to control energization of the stoker, electronic amplifying means interconnecting said impedance means and said relay to effect energization of said relay in accordance with the temperature of said impedance, and further electronic amplifying means directly interconnecting said impedance means and said first named amplifying means for rendering said first named amplifying means ineffective to energize said relay when the temperature of the stoker fire drops below a predetermined value.

3. Control apparatus for a stoker fired furnace, comprising in combination, electrical impedance means for sensing the temperature condition of the stoker fire, a relay adapted to control energization of the stoker, electronic amplifying means interconnecting said impedance means and said relay to effect energization of said relay in accordance with the temperature of said impedance, said means comprising an electron discharge device having an anode, cathode and control element, and further electronic means connected between said discharge device and said impedance means to cause said control element to assume a potential with respect to said cathode to render said device ineffective to energize said relay when the temperature of the stoker fire drops below a predetermined value.

4. Control apparatus for a furnace, comprising in combination, electrical impedance means for sensing the temperature within said furnace, said impedance means varying its impedance value with changes in temperature, a relay adapted to control energization of said furnace, a first electron discharge device connected to said impedance means so that the conductivity of said device is controlled by the impedance of said impedance means, a normally conducting second electron discharge device having an input connected to said first discharge device and which input assumes a voltage dependent upon the conductivity of said first discharge device, means connecting said relay means in the output of said second discharge device, electrical circuit means including said first discharge device rendering said second discharge ineffective to energize said relay when the temperature of said impedance is such that its impedance is of a first value and not affecting said second discharge device when the temperature of said impedance is such that its impedance is of a second value, and further electrical circuit means including said impedance means when the temperature thereof is such that its impedance is of a third value connected to said second discharge device to render said second discharge device ineffective to energize said relay.

5. Control apparatus for a stoker fired furnace, comprising in combination, electrical impedance means responsive to a temperature indicative of the temperature conditions of the stoker fire, said impedance means varying its impedance value with changes in temperature, a relay adapted to control energization of the stoker, a first electron discharge device connected to said impedance means so that the conductivity of said device is controlled by said impedance means, a normally conducting second electron discharge device having an input connected to said first discharge device and which input assumes a voltage dependent upon the conductivity of said first discharge device, means connecting said relay means in the output of said second discharge device, means including said first discharge device rendering said second discharge ineffective to energize said relay when the temperature of said impedance is such that its impedance is of a first value and not affecting said second discharge device when the temperature of said impedance is such that its impedance is of a second value, eelctronic means connected to the input of said second discharge device, and means including said impedance means and said electronic means for rendering said second discharge device ineffective to energize said relay when the temperature of said impedance is such that its impedance is of a third value.

6. Condition control apparatus, comprising in combination, a condition sensing network adapted to have an impedance means connected thereto and which impedance means varies with the magnitude of a controlled condition, a control relay adapted to effect operation of condition changing means when energized, a first impedance device whose impedance varies in accordance with the voltage on a control electrode thereof, said device having said relay connected in circuit therewith and normally conducting sufficiently to maintain said relay energized when said control electrode has no voltage thereon, second and third impedance devices whose impedances vary in accordance with the voltage on the control electrodes thereof, means connecting said network to the control electrodes of said second and third impedance devices, output circuits for said second and third devices, means connecting the electrode of said first impedance device to said output circuits, said output circuits rendering said first device ineffective whenever either of said second or third devices is operative, and means including said network for rendering said second device operative when the controlled condition deviates in one direction from the desired value and rendering said third device operative when the controlled condition deviates in the opposite direction from the desired value.

7. Control apparatus for a stoker fired furnace, comprising in combination, an electrical impedance network adapted to have a first impedance element thereof exposed to the stoker fire to be controlled, said network having a second impedance whose impedance varies with load demand, a heating element for said second impedance, said heating element adapted to be energized by means including a thermostatic switch which is exposed to the temperature of a space whose temperature varies in accordance with the temperature of the stoker fire, and electrical sensing means connected to said network adapted to energize or deenergize the stoker in accordance with the effect said impedances have upon said network.

8. Control apparatus for a stoker fired furnace, comprising in combination, an electrical impedance network adapted to have a first impedance element thereof exposed to the stoker fire to be controlled, said network having a second impedance whose impedance varies with load demand, a heating element for said second impedance, said heating element adapted to be energized by means including a thermostatic switch which is exposed to the temperature of a space whose temperature varies in accordance with the temperature of the stoker fire, and electrical sensing means connected to said network adapted to energize or deenergize the stoker, said sensing means comprising electronic amplifying means energizing a control relay and means for rendering said amplifying means inoperative whenever the impedance differential between said first and second impedances becomes greater than a first value or less than a second value.

9. Control apparatus for a stoker fired furnace, comprising in combination, an electrical impedance network adapted to have a first impedance element thereof exposed to the stoker fire to be controlled, said network having a second impedance whose impedance varies with load demand, a heating element for said second impedance, said heating element adapted to be energized by means including a thermostatic switch which is exposed to the temperature of a space whose temperature varies in accordance with the temperature of the stoker fire, and electrical sensing means connected to said network adapted to energize or deenergize the stoker, said sensing means comprising electronic amplifying means energizing a control relay, and a pair of control discharge devices for rendering said amplifying means inoperative when the impedance differential between said network impedances is greater than a first value or less than a second value.

10. Control apparatus for a stoker fired furnace, comprising in combination, an electrical impedance network adapted to have a first impedance element thereof exposed to the stoker fire to be controlled, said network having a second impedance whose impedance varies with load demand, a heating element for said second impedance, said heating element adapted to be energized by means including a thermostatic switch which is exposed to the temperature of a space whose temperature varies in accordance with the temperature of the stoker fire, and electrical sensing means connected to said network adapted to energize or deenergize the stoker, said sensing means comprising electronic amplifying means energizing a control relay, and a pair of control discharge devices for rendering said amplifying means inoperative when the impedance differential between said network impedances is greater or less than a predetermined amount, one of said devices being operative when the impedance differential between said impedances is less than a first predetermined amount and the other of said devices being operative when the said impedance differential is greater than a second predetermined amount.

11. In a control for a burner for a furnace, the combination comprising, an electrical network having a pair of temperature sensing impedances connected to vary the balance of said network, one of said impedances being adapted to be exposed to the burner fire and the other of said impedances having a heating element directly associated therewith in fixed relationship, an energizing circuit for said heater adapted to be completed by a thermostatic switch which is sensing temperature in a space whose temperature is being controlled, said thermostatic device energizing said heater upon a need for an increase in space temperature, and electrical sensing means connected to said network and adapted to energize the burner, said sensing means being operative to energize the burner when said heater has caused the differential between said pair of impedances to be greater than a first predetermined value and to deenergize the burner when the burner fire temperature causes the differential between said pair of impedances to be less than a second predetermined value.

12. In a control for a stoker fired furnace, the combination comprising, an electrical network having a pair of temperature sensing impedances connected to vary the balance of said network, one of said impedances being adapted to be exposed to the stoker fire and the other of said impedances having a heater element directly associated therewith, an energizing circuit for said heater adapted to be completed by a thermostatic switch which is sensing temperature in a space whose temperature is being controlled, said thermostatic device energizing said heater upon a need for an increase in space temperature, and electrical sensing means connected to said network and adapted to energize the stoker, said sensing means comprising electronic amplifying means having a control relay in circuit therewith, and a pair of electronic control devices for rendering said amplifying means inoperative when the impedance differentials between said network impedances lie outside a predetermined range.

13. In a control for a stoker fired furnace, the combination comprising, an electrical network having a pair of temperature sensing impedances connected to vary the balance of said network, one of said impedances being adapted to be exposed to the stoker fire and the other of said impedances having a heater element directly associated therewith, an energizing circuit for said heater adapted to be completed by a thermostatic switch which is sensing temperature in a space whose temperature is being controlled, said thermostatic device energizing said heater upon a need for an increase in space temperature, and electrical sensing means connected to said network and adapted to energize the stoker, said sensing means comprising electronic amplifying means having a control relay in circuit therewith, a pair of electronic control devices for rendering said amplifying means inoperative when the impedance differentials between said network impedances lie outside a predetermined range, one of said pair of devices being operative when said differential is less than a predetermined amount and the other of said pair when said differential is greater than a predetermined amount.

14. In a control for a stoker fired furnace, the combination comprising, an electrical network having a pair of temperature sensing impedances connected to vary the balance of said network, one of said impedances being adapted to be exposed to the stoker fire and the other of said impedances having a heating element directly associated therewith, heat storing means surrounding said heater and said other impedance, an energizing circuit for said heater including a thermostatic device having a heater therefor which is capable of changing the temperature of said device by an amount greater than the operating differential of said device, said thermostatic device periodically energizing said heater at a rate dependent upon space temperature so that the temperature of said other impedance is maintained at a value indicative of load demand, and electrical sensing means connected to said network and adapted to energize the controlled stoker whenever the temperature of the stoker fire as indicated by the temperature of said one impedance deviates from a value determined by the temperature of said other impedance.

HENRY L. HANSON.

REFERENCES CITED

The following references are of record in the file of this patent:

UNITED STATES PATENTS

| Number | Name | Date |
|---|---|---|
| 1,756,688 | Hutchinson | Apr. 29, 1930 |
| 2,261,343 | De Florez | Nov. 4, 1941 |
| 2,292,975 | Spangenberg | Aug. 11, 1942 |
| 2,308,318 | Sparrow | Jan. 12, 1943 |
| 2,318,012 | Pond | May 4, 1943 |
| 2,339,618 | Crago | Jan. 18, 1944 |
| 2,366,501 | Gille | Jan. 2, 1945 |
| 2,420,043 | Johnson | May 6, 1947 |
| 2,482,739 | Wilson | Sept. 20, 1949 |